(12) United States Patent
Hinderling et al.

(10) Patent No.: US 10,107,624 B2
(45) Date of Patent: Oct. 23, 2018

(54) GEODETIC SURVEYING DEVICE WITH A MICROLENS ARRAY

(71) Applicant: HEXAGON TECHNOLOGY CENTER GMBH, Heerbrugg (CH)

(72) Inventors: Jürg Hinderling, Marbach (CH); Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 452 days.

(21) Appl. No.: 14/454,395

(22) Filed: Aug. 7, 2014

(65) Prior Publication Data

US 2015/0042790 A1 Feb. 12, 2015

(30) Foreign Application Priority Data

Aug. 8, 2013 (EP) .................................... 13179725

(51) Int. Cl.
*G01C 3/08* (2006.01)
*G01C 11/02* (2006.01)
(Continued)

(52) U.S. Cl.
CPC ............... *G01C 11/02* (2013.01); *G01C 1/04* (2013.01); *G01C 3/08* (2013.01); *G01C 15/00* (2013.01)

(58) Field of Classification Search
None
See application file for complete search history.

(56) References Cited

U.S. PATENT DOCUMENTS 5,076,687 A 12/1991 Adelson
5,886,340 A 3/1999 Suzuki et al.
(Continued)

FOREIGN PATENT DOCUMENTS

DE 195 04 039 C1 4/1996
DE 197 10 722 A1 10/1997
(Continued)

OTHER PUBLICATIONS

Ng, R., Levoy, M., Bredif, M., Duval, G., Horowitz, M., and Hanrahan, P. 2005. Light field photography with a handheld plenoptic camera. Stanford University Computer Science Tech Report CSTR Feb. 2005.*
(Continued)

*Primary Examiner* — Jayanti K Patel
*Assistant Examiner* — Shadan E Haghani
(74) *Attorney, Agent, or Firm* — Maschoff Brennan

(57) ABSTRACT

Some embodiments relate to a geodetic surveying device having a beam source for generating measurement radiation, a base defining a vertical axis, a support carrying a targeting unit and defining a tilt axis, the support being arranged on the base and rotatable relative to the base about the vertical axis, and the targeting unit being arranged rotatable relative to the support about the tilt axis, and an angle- and distance-measuring functionality. Moreover, the geodetic surveying device has an image acquisition unit for acquiring images of an object in a field of view defined by the image acquisition unit, and a control and processing unit. The image acquisition unit has at least an image sensor and a microlens array with a multiplicity of diffractive and/or refractive optical elements arranged in a defined two-dimensional manner.

19 Claims, 8 Drawing Sheets

(51) Int. Cl.
*G01C 15/00* (2006.01)
*G01C 1/04* (2006.01)

(56) References Cited

U.S. PATENT DOCUMENTS

| | | | |
|---|---|---|---|
| 6,072,642 | A | 6/2000 | Shirai |
| 6,081,327 | A | 6/2000 | Gaechter et al. |
| 6,433,858 | B1 | 8/2002 | Suzuki |
| 6,504,602 | B1 | 1/2003 | Hinderling |
| 7,583,373 | B2 | 9/2009 | Schwarz |
| 7,672,049 | B2 | 3/2010 | Fruhmann et al. |
| 7,728,963 | B2 | 6/2010 | Kirschner |
| 7,842,911 | B2 | 11/2010 | Kirschner et al. |
| 8,331,624 | B2 | 12/2012 | Braunecker et al. |
| 8,400,555 | B1* | 3/2013 | Georgiev ........... H04N 5/23212 348/222.1 |
| 8,699,756 | B2 | 4/2014 | Jensen |
| 2006/0152710 | A1* | 7/2006 | Braunecker ............. G01C 9/06 356/139.1 |
| 2008/0205707 | A1* | 8/2008 | Braunecker ............. G01C 1/04 382/106 |
| 2012/0327259 | A1 | 12/2012 | Tamura |
| 2013/0093882 | A1 | 4/2013 | Kotzur et al. |
| 2015/0015895 | A1* | 1/2015 | Bridges ................... G01S 17/42 356/614 |

FOREIGN PATENT DOCUMENTS

| | | |
|---|---|---|
| DE | 199 267 06 A1 | 12/1999 |
| DE | 199 49 580 B4 | 3/2007 |
| DE | 10 2009 031 562 A1 | 1/2011 |
| EP | 1 081 459 B1 | 6/2002 |
| EP | 1 662 278 A1 | 5/2006 |
| EP | 1 681 533 A1 | 7/2006 |
| EP | 1 686 350 A1 | 8/2006 |
| EP | 2 219 011 A1 | 8/2010 |
| EP | 2 405 236 B1 | 10/2012 |
| WO | 2005/026767 A1 | 3/2005 |
| WO | 2006/053837 A1 | 5/2006 |

OTHER PUBLICATIONS

European Search Report dated Jan. 21, 2014 as received in Application No. 13 17 9725.

* cited by examiner

GEODETIC SURVEYING DEVICE WITH A MICROLENS ARRAY

FIELD OF THE INVENTION

The invention relates to a geodetic surveying device for measuring a target point.

BACKGROUND

For measuring a target point, numerous geodetic surveying devices have been known since ancient times. In this case, direction or angle and usually also distance from a measuring device to the target point to be measured are recorded and, in particular, the absolute position of the measuring device together with reference points possibly present are detected as spatial standard data.

Generally known examples of such geodetic surveying devices include the theodolite, tachymeter and total station, which is also designated as electronic tachymeter or computer tachymeter. One geodetic measuring device from the prior art is described in the publication document EP 1 686 350, for example. Such devices have electrical-sensor-based angle and, if appropriate, distance measuring functions that permit direction and distance to be determined with respect to a selected target. In this case, the angle and distance variables are determined in the internal reference system of the device and, if appropriate, also have to be combined with an external reference system for absolute position determination.

In many geodetic applications, points are measured by specifically configured target objects being positioned there. The latter usually consist of a plumb staff with a reflector (e.g. an all-round prism) for defining the measurement path or the measurement point. In the case of such measurement tasks, for controlling the measurement process and for defining or registering measurement parameters, a number of data, instructions, speech and further information are transmitted between target object—in particular a handheld data acquisition device at the target object—and central measuring device. Examples of such data include the identification of the target object (type of prism used), inclination of the plumb staff, height of the reflector above ground, reflector constants or measurement values such as temperature or air pressure. These information items or situation-governed parameters are necessary for enabling highly precise targeting and measurement of the measurement point defined by the plumb rod with prism.

Modern total stations have microprocessors for digital further processing and storage of detected measurement data. The devices generally have a compact and integrated design, wherein coaxial distance-measuring elements and also computing, control and storage units are usually present in a device. Depending on the expansion stage of the total station, motorization of the targeting or sighting device and—in the case of the use of retroreflectors (for instance an all-round prism) as target objects—means for automatic target seeking and tracking can additionally be integrated. As a human-machine interface, the total station can have an electronic display control unit—generally a microprocessor computing unit with electronic data storage means—with display and input means, e.g. a keyboard. The measurement data detected in an electrical-sensor-based manner are fed to the display control unit, such that the position of the target point can be determined, optically displayed and stored by the display control unit. Total stations known from the prior art can furthermore have a radio data interface for setting up a radio link to external peripheral components such as e.g. a handheld data acquisition device, which can be designed, in particular, as a data logger or field computer.

For sighting or targeting the target point to be measured, geodetic surveying devices of the generic type have a telescopic sight, such as e.g. an optical telescopic sight, as sighting device. The telescopic sight is generally rotatable about a vertical axis and about a horizontal tilt axis relative to a base of the measuring device, such that the telescopic sight can be aligned with the point to be measured by pivoting and tilting. Modern devices can have, in addition to the optical viewing channel, a camera for detecting an image, said camera being integrated into the telescopic sight and being aligned for example coaxially or in a parallel fashion, wherein the detected image can be represented, in particular, as a live image on the display of the display control unit and/or on a display of the peripheral device—such as e.g. the data logger—used for remote control. In this case, the optical system of the sighting device can have a manual focus—for example an adjusting screw for altering the position of a focusing optical system—or an autofocus, wherein the focus position is altered e.g. by servomotors. By way of example, such a sighting device of a geodetic surveying device is described in EP 2 219 011. Automatic focusing devices for telescopic sights of geodetic devices are known e.g. from DE 197 107 22, DE 199 267 06 or DE 199 495 80.

The optical system or the optical viewing channel of the sighting device usually contains an objective lens group, an image reversal system, a focusing optical system, a graticule for producing a reticle and an eyepiece, which are arranged e.g. in this order from the object side. The position of the focusing lens group is set depending on the object distance in such a way that a sharp object image arises on the graticule arranged in the focusing plane. Said image can then be viewed through the eyepiece or e.g. detected with the aid of a camera arranged coaxially.

By way of example, the construction of generic telescopic sights of geodetic devices is disclosed in the publication documents EP 1 081 459 or EP 1 662 278.

On account of the beam path that is usually to be utilized jointly both as viewing channel and for measurements, such devices require the technical design of said beam path in the manner of construction of a telescopic sight with specialized, high-precision optical systems that are to be produced with a high outlay. Furthermore, an additional separate transmitting and receiving channel and also an additional image plane for the wavelength of the distance measuring device are provided for the coaxial electronic distance measurement.

Since target objects (e.g. the plumb rods with target mark, such as an all-round prism, which are usually used for geodetic purposes) can be targeted sufficiently precisely with the naked eye on the basis of the sighting device despite the 30-fold optical magnification often provided (i.e. not conforming to geodetic accuracy requirements), conventional surveying devices in the meantime have as standard an automatic target-tracking function for prisms serving as target reflector (ATR: "Automatic Target Recognition"). For this, a further separate ATR light source—e.g. a multimode fiber output, which emits optical radiation having a wavelength in the range of 850 nm—and a specific ATR detector (e.g. CCD area sensor) sensitive to said wavelength are conventionally additionally integrated in the telescopic sight.

In the context of the ATR fine-targeting function, in this case the ATR measurement beam is emitted in the direction of the optical targeting axis of the sighting device and is retroreflected at the prism and the reflected beam is detected by the ATR sensor. Depending on the deviation of the alignment of the optical targeting axis from the prism, in this case the impingement position of the reflected radiation on the ATR sensor also deviates from a central sensor area position (i.e. the reflection spot of the ATR measurement beam retroreflected at the prism on the ATR area sensor does not lie in the center of the ATR area sensor and therefore does not impinge on a desired position defined e.g. on the basis of calibration as that position which corresponds to the optical targeting axis).

If this is the case, if the alignment of the sighting device is slightly readjusted in a motor-driven manner in such a way that the ATR measurement beam retroreflected at the prism impinges highly precisely in the center of the sensor area on the ATR area sensor (i.e. the horizontal and vertical angles of the sighting device are thus iteratively changed and adapted until the center of the reflection spot coincides with the desired position on the ATR area sensor). Alternatively, a residual deviation between the impingement point of the retroreflected ATR measurement beam on the ATR area sensor and the center of the sensor area can also be taken into account computationally and converted into an angle, which is correspondingly added to the solid angle—detected with the aid of the angle sensors—at which the targeting axis points. In other words, the solid angle with respect to the target point can in this case also be derived from the solid angle—detected with the aid of the angle sensors—of the targeting axis and an offset of the detected ATR measurement beam reflection from the sensor center (i.e. from that central point on the ATR sensor at which the targeting axis is imaged).

As a result, the achievable accuracy in the alignment of the optical targeting axis with the prism can be significantly increased by comparison with manually performed targeting with a reticle and on the basis of measurement by the naked eye. In order to ensure the functioning of the automatic targeting on the basis of evaluation of the position of the reflection spot of the ATR measurement beam retroreflected at the prism on the ATR area sensor, it is necessary, before the function starts, to align the sighting device with the target reflector at least approximately in such a way that the retroreflected ATR measurement beam also impinges on the ATR area sensor. For this purpose, it is possible e.g. beforehand to effect manual targeting of the target reflector on the basis of measurement by eye or to perform an automatic coarse targeting function.

The manual, coarse sighting of the target object can be effected by the user, on the one hand, by viewing and targeting the target object on a user display of the display control unit directly on the surveying device or on the display of a separate peripheral device (e.g. data logger as remote control). Often, however, this is still effected by means of viewing the target through the eyepiece of the telescopic sight (i.e. of the sighting device), since a displayed display image on the display control unit or the data logger may be insufficiently recognizable during use in practice—e.g. in the case of insolation.

Furthermore, the prior art discloses methods wherein the solid angles between the measuring device and the target object are determined with the aid of an image and image processing (in particular on the basis of a position of a target object determined in the recorded image and depending on a known or also detected image-recording direction). Such methods are described e.g. in WO 2005/026767 or in WO 2006/053837.

There is a disadvantage both in the case of a manual and in the case of an image-based automatic fine alignment of a surveying device on a target due to the typical design of the targeting unit with a focusing lens group, the design of which must be set very precisely and robustly and the position of which must be set depending on a given distance to a target to be targeted in order to obtain a clear and in-focus image of the target without aberration.

For the purposes of accurate and reliable targeting of the target, it is necessary in this case to focus accurately on the object which is actually targeted. By way of example, if an obstacle (e.g. a branch of a tree) is situated directly along the measurement axis, with this obstacle being placed at a significantly different distance than the target, and if the target is depicted in focus for targeting purposes, what may occur is that a distance to the obstacle but not to the target is determined. In such cases, the obstacle can no longer be perceived in the case of corresponding defocusing—for example by the user of the system.

In the case where the user notices that the determined distance cannot correspond to an actual distance to the target, an exact alignment and renewed measurement is connected with an additional, significantly increased time outlay, which has a negative effect on the productivity. In this case, a distance measurement according to the prior art to non-cooperative and far-away targets can take several seconds.

By way of example, focusing of an object to be targeted can be brought about by means of a contrast measurement. Here, the focusing member is displaced over the whole focusing range and, simultaneously, an image sequence of the object is recorded at short time intervals by means of the integrated camera. The image processing is used to establish the image from this image sequence in which the object is imaged with the highest contrast, and the focusing member is moved to the corresponding position. A disadvantage of this method once again includes the time required for moving the focusing member over the whole range and the image evaluation only being carried out subsequently.

In this context, a further disadvantage emerges from the structural design of a displacement unit for the focusing member. In particular, the optical axis of the main objective lens in a telescopic sight coincides with the optical axis of the focusing member. However, deviations which emerge from limitations in the mechanical implementation lead to aberrations in the optical image, which can have a negative influence on the targeting accuracy. On the one hand, such deviations emerge from the mechanical guide of the focusing member not being parallel with the optical axis of the objective lens, on the other hand, a certain amount of mechanical play on this guide must be accepted for a fast movement of the focusing member.

SUMMARY

Some embodiments provide for a geodetic surveying device, by means of which a desired target can be targeted with less outlay, more quickly, more accurately and more reliably.

Some embodiments reliable for correspondence between a graphic display of the target and an exact measurement of precisely this target.

Some embodiments include the provision of a corresponding method for a geodetic surveying device.

The invention relates to a geodetic surveying device comprising a beam source for generating measurement radiation, a base defining a vertical axis, a support carrying a targeting unit and defining a tilt axis, the support being arranged on the base and rotatable relative to the base about the vertical axis, and the targeting unit being arranged rotatable relative to the support about the tilt axis. Moreover, the geodetic surveying device comprises an angle- and distance-measuring functionality, an image acquisition unit for acquiring images of an object in a field of view defined by the image acquisition unit, and a control and processing unit.

According to the invention, the image acquisition unit comprises at least an image sensor and a microlens array with a multiplicity of diffractive and/or refractive optical elements arranged in a defined two-dimensional manner. Here, during a measurement process by means of the image sensor, respective image pieces generated by the diffractive and/or refractive optical elements and representing at least parts of the object can be acquired and an image data record representing the image pieces can be generated.

According to the invention, the diffractive and/or refractive optical elements specifically are embodied as single lenses with a respectively defined focal length.

As a result of such an arrangement, an object can be imaged on the image sensor a number of times and, in particular, with different levels of focusing (corresponding to the focal lengths of the elements of the lens array). As a result of the provision of such a microlens array in the optical system of the image acquisition unit, a significant increase in the depth of field for recorded images or image pieces is obtained. The data record which can be generated on the basis thereof therefore contains image and depth information about the object. On the basis of this data record it is possible, for example, to generate images of the object representing different focus settings according to the data acquisition, without the necessity of having to re-record an image with a different level of focusing (focal length)—as is required in typical image acquisition systems with a focusing optical unit. This also dispenses with the requirement of refocusing for acquiring objects at different distances.

In general, for a user of a surveying device according to the invention, this results in a great advantage in respect of targeting specific objects. As a result of, according to the invention, the large distance range in which objects can be acquired in focus and depicted in an image, a correspondingly larger distance range is accessible to the user and the objects situated therein can easily be identified. Therefore, the user can clearly identify objects at significantly different distances on a display and, on the basis thereof, select the desired object and target it quickly and accurately.

The image acquisition unit of the geodetic surveying device according to the invention is based on the principle of a plenoptic camera.

A plenoptic camera, which is also referred to as a light-field camera, or the image acquisition unit of the surveying device acquires a 4D light field of a scene; i.e., in contrast to a conventionally acquired 2D image, it is not only a position and intensity of a light beam that is acquired on the image sensor in the case of a 4D light field, but also the direction from which this light beam is incident (beams in three-dimensional space can be described by four parameters—position (x, y) and direction ($\alpha x$, $\alpha y$)—at any point along a propagation axis (z)). This light-field measurement is made possible by a grating made of a plurality of microlenses which generate a multiplicity of pupils and e.g. image on a CMOS sensor at different positions in the object space and therefore permit both a direction measurement and a brightness measurement. As a result, the light field is acquired with a resolution determined by the number of microlenses and sensor pixels. The microlenses are usually arranged in the form of a microlens array which is situated at a certain distance in front of the sensor. In order to simplify the reconstruction of the object image, the microlens array preferably comprises lenses with typically two to five different focal lengths. Using such an optical arrangement in front of the image sensor, a plurality of images of the scene are acquired by the grating and the sensor in accordance with the lens arrangement.

A single focal length for the optical elements suffices to acquire the light field. By way of example, cameras with a plurality of (three) different focal lengths are also realized since the calculation of in-focus images is possible thereby in a simplified manner. The image can then be assembled by image pieces, which are in focus, to form an image region. Here, so-called "ray tracing" is dispensed with, as a result of which there is no need to calculate the light beams which meet on points of the object.

As a result of the lens grating, each image point is refracted and widened to a cone which is incident on the sensor area with a circular shape. As a result of this, it is possible to determine the direction from which the light beam was incident: a light beam with perpendicular incidence is incident on the center of the circle; a light beam incident at an angle is incident further toward the edge. Hence, the focal plane for an image to be displayed can subsequently be recalculated by means of an algorithm (of software) and/or the image can be recalculated in accordance with a defined focal plane and therefore the focus can be modified like in a conventional objective lens. The information from a scene is imaged in a plurality of image points of the camera chip (image sensor) so that information about the direction of the incident light beam can be evaluated.

Here, the maximum depth of field is very high, there is no need to wait for a focusing process and the focal plane of a recorded image can subsequently be adapted.

In accordance with one special embodiment according to the invention, the diffractive and/or refractive optical elements have at least two different focal lengths.

In particular, the image sensor and the microlens array are arranged and interact in such a way that, as a result of the arrangement and the focal lengths of the diffractive and/or refractive optical elements, the generated image pieces in each case represent at least part of the field of view and can be projected with a defined offset onto the image sensor, i.e. the image pieces generated by the respective optical elements of the lens array are not imaged in a congruent (superposed) manner on the sensor, but rather are offset with respect to one another in each case. In particular, there also is such an offset when use is made of a lens array with only one focal length.

In particular, according to the invention, the microlens array can be arranged with a fixed position and alignment relative to the image sensor and a respective beam entry direction for light beams incident on the image sensor can be derived from the image data record. Compared to image acquisition units or targeting units from the prior art, this allows for an adjustment mechanism, which would have been necessary when using an optical focusing member for setting a desired focusing level, to be dispensed with. As a result, error sources in respect of the imaging accuracy, which potentially occur in conjunction with such a focusing member, are avoided by the provision and arrangement, according to the invention, of the microlens array.

Moreover, according to the invention, the diffractive and/or refractive optical elements of the microlens array can be assigned to a number of groups, with the optical elements assigned to a group in each case having the same focal length and a first group differing from a second group in terms of the focal length of the assigned optical elements. By way of example, the microlens array can be embodied as a lens grid made of three different lens types, which differ in terms of their focal length.

In accordance with a further embodiment according to the invention, the microlens array is embodied and arranged in such a way that image pieces of objects at different object distances can be projected onto a common image plane by the groups of optical elements, the image sensor being arranged for acquiring the image pieces generated in the image plane, the image sensor in particular being arranged in the image plane.

In particular—independently of whether different focal lengths of the optical elements are present—the arrangement of array and sensor can be selected in such a way that each microlens is assigned to 20 to 40 image points on the camera sensor.

In accordance with a specific embodiment, the sensor can have at least 20×20 pixels per microlens for a demanded resolution capability. In particular, provision should be made in this case for 20×20 to 30×30 pixels per microlens and said pixels should be assigned to the latter. By way of example, the case of 17 MPx (megapixels) with image dimensions of 23.6 mm×15.6 mm results in a lens array size of 27 200 single lenses (=diffractive and/or refractive optical elements) in the case of 25×25 pixels satisfying the condition of no overlap of the micro images. In order to obtain a correspondingly higher resolution with a sufficient sensitivity, is preferably a sensor with the 35 mm format (36 mm×24 mm) with 24 MPx. In the case of an assignment of 28×28 pixels per microlens, a lens array with 30 612 single lenses is provided.

In accordance with a special embodiment of the invention, the image acquisition unit comprises an objective lens arranged in such a way that incident light from the field of view is projected onto the microlens array by the objective lens or light incident through the microlens array is projected onto the image sensor by the objective lens. The provision and arrangement of objective lenses or lenses in the image acquisition unit here depends, specifically, on how the microlens array and/or the image sensor are configured and interact. If an image data record which represents the generated image pieces in accordance with the requirements on the surveying system can be generated by the provision of such a (special) array that the image pieces can be imaged in a suitable manner (with suitable different focal lengths) on the sensor without an additional objective lens, it is possible, for example, to dispense with an additional lens. By way of example, such an arrangement is advantageous for acquiring microscopic objects with a small distance from the lens array.

Moreover, in the context of the present invention, the image sensor can, according to the invention, comprise a plurality of sub-sensors arranged in two dimensions, with the image pieces generated by the microlens array being projectable onto the sub-sensors and it being possible to generate the image data record by means of the plurality of sub-sensors. Here, for example, the lens array and the sub-sensors can be arranged in such a way that defined single lenses of the array or groups of single lenses respectively project image pieces onto in turn specific sensors, which are assigned to these single lenses or groups, and these image pieces can then be acquired by means of the respective sub-sensors. By way of example, an assignment of single lenses and sub-sensors can be configured in accordance with the above explanations in respect of the assignment with an image sensor.

Alternatively or additionally, a further image sensor or a plurality of further image sensors, in particular, once again, image sensors comprising sub-sensors, can be provided, for example to achieve an increase in the resultant image resolution or to render a larger field of view acquirable.

In respect of the structural provision of the image acquisition unit on the geodetic surveying device, the image acquisition unit in accordance with a specific embodiment, according to the invention, of the surveying device is embodied as an overview camera, the overview camera defining a field of view separate from the targeting unit and being arranged separately from the targeting unit. As an alternative or in addition thereto, the image acquisition unit can, within the scope of an alternative embodiment according to the invention, be arranged in the targeting unit, in particular arranged in such a way that the field of view of the image acquisition unit substantially corresponds to the field of view of a telescopic sight for targeting the target of the targeting unit. Moreover, the image acquisition unit can be provided e.g. in the support of the surveying device and, as a result thereof, it is possible in each case to acquire a field of view corresponding to the azimuthal alignment of the device. Arranging the image acquisition unit in the targeting unit or in such a way that the field of view which can be acquired by the image acquisition unit is set in accordance with the alignment of the targeting unit, provides for an acquisition of image pieces in the field of view in accordance with a current alignment—both in terms of azimuth and elevation—of the targeting unit.

The invention moreover relates to a method for image acquisition using a geodetic surveying device. The geodetic surveying device comprises a beam source for generating measurement radiation for measuring the distance, a base defining a vertical axis and a support carrying a targeting unit and defining a tilt axis, the support being arranged on the base and rotatable relative to the base about the vertical axis, and the targeting unit being arranged rotatable relative to the support about the tilt axis. The surveying device moreover comprises an angle- and distance-measuring functionality, and an image acquisition unit for acquiring images of an object in a field of view defined by the image acquisition unit.

According to the invention, the image acquisition takes place, at least with a common generation of a multiplicity of image pieces, respectively imaging the object at least in part, in particular a number of times, in particular with at least two different depth of field ranges, in particular focal planes, and with an acquisition of the image pieces and with a generation of an image data record representing the image pieces.

By way of example, such an image acquisition can be performed using a surveying device in accordance with one of the above-described embodiments of the invention, with the generation of the multiplicity of image pieces being brought about by means of the microlens array.

As a result of the image acquisition according to the invention, single image pieces of an object are generated, which image pieces image the object with a specific focal length and a large depth of field when the image pieces are pieced together. In the process, an image data record which represents the image pieces (specifically, each image piece in this case images a different part of the object) is generated. Moreover, such image pieces are generated (together, in particular simultaneously) with, in particular, at least one further different focal length (depth of field range) such that the object is then imaged with at least two different focal lengths and the data record comprises image information which represents the image information in respect of the image pieces with the two focal lengths. Hence, images of the object or a corresponding data record are generated with an individual generation of the image pieces or with an acquisition of these pieces, which data record represents the object with either a single or at least two different depth of field ranges, i.e. image information is available in accordance with an acquisition of the object with one or at least two different focal lengths (with different focus settings).

In accordance with a special embodiment of the invention, distance information for the object is derived from the image data record, in particular by means of triangulation, in particular for each image piece, in particular with a 3D point cloud being generated. By way of example, for this purpose, use can be made of a distance between two lens elements (=diffractive and/or refractive optical elements) of the microlens array as a stereo basis and the images generated using these lens elements can be used as a (stereo) basis for a stereophotogrammetric distance determination. Here, each lens element (in conjunction with the image sensor) can be considered to be an individual camera.

Therefore, the largest achievable stereo basis in the object space substantially corresponds to the entry pupils (defined by the lens elements) situated furthest apart that can be seen through the objective lens placed in front of the lens array. By way of example, the object-side stereo angle is formed by the chief rays which pass through the center of the entry pupils assigned to the two microlenses.

Therefore, depth information can also be established from the image data, and so such a method or an image acquisition unit, which can be used for this purpose and e.g. operates according to the principle of a plenoptic camera, supplies 3D information of an object or can also be used as a 3D camera.

Moreover, according to the invention, a sub-image data record can be derived from the image data record, the former representing a sub-image with at least one image region which can be depicted in focus, with image elements within the at least one image region being generated substantially on the basis of a single image piece or a defined number of image pieces from the multiplicity of image pieces generated together, in particular on the basis of the different depth of field ranges for the image pieces. In particular, the image elements are in this case acquired with a common object distance and/or the image region is selected by a user input, in particular by manual selection of an image point or graphic definition of an image region.

Therefore, the sub-image can be generated on the basis of the image data record in such a way that a desired image region is depicted in focus—within the scope of the depth of field range defined by the image pieces. Thus, for example, it is possible to select a image point or an image region which should be depicted in focus and those image pieces (in the case of one focal length more particularly all image pieces) with the corresponding depth of field range or the corresponding focal plane are selected from the image data record and displayed. To this end, the image processing can be used to analyze the image pieces in respect of the degree of sharpness thereof and those image pieces whose degree of sharpness can be used for the selected image point or image region can be identified. If a different image region is intended to be depicted in focus, the calculation process can be performed again and other image pieces suitable for the other image region in respect of the depth of field range are selected for display purposes.

Alternatively, in the case of such a selection of image regions to be displayed in focus, a distance to the object, which corresponds to this point or region, can be calculated on the basis of the data record and objects lying at this distance can be depicted in focus.

Therefore, using an image acquisition according to the invention, different planes (in respect of the distance to the image acquisition unit) of a field of view can be depicted selectively in focus, wherein the displayed viewing region (field of view) remains constant and the different images in each case exhibit a common acquisition time.

In accordance with a further embodiment according to the invention, an in-focus image with a depth of field which is as large as possible, in particular corresponding to the different depth of field ranges for the image pieces, is calculated from the image data record. As a result, it is possible to generate an image which in each case depicts objects at different distances in focus at the same time. By way of example, to this end, that image piece is selected for display for all image regions or image points of the field of view to be depicted which, in accordance with the distance present for the respective image region (image point), has an ideally focused representation of the region (in particular in the case of different focal lengths of the optical elements). By way of example, this can be brought about by means of contrast analysis. If all objects situated within the field of view are situated within the depth of field range covered by the image pieces (or by the possibly different focal lengths of the microlens array), then it is possible to generate an image from this, which depicts all objects in the image in focus.

Within the scope of the invention, an image corresponding to a currently measured distance can moreover be generated from the image data record in such a way that objects situated at the measured distance are depicted in the image with a first degree of sharpness and objects at a different distance are depicted with a lower degree of sharpness. As a result, it is possible, for example, to depict precisely one focal plane in focus, with other focal planes or depth of field ranges remaining depicted out of focus. By way of example, this allows improved differentiation of relevant objects relative to unimportant objects in the image.

In accordance with one special embodiment of a surveying device according to the invention, the control and processing unit is embodied in such a way that a method according to the invention, as described above, can be carried out therewith.

An image calculation or a special calculation of data, as described above, can, for example, be performed directly on the geodetic surveying device or—alternatively or additionally, i.e. with e.g. at least partial calculations taking place on the surveying device—on an external computer, e.g. a field controller or a server (in accordance with the principles of "cloud computing").

The invention moreover relates to a computer program product, stored on a machine-readable medium, for controlling the generation of the multiplicity of image pieces and the acquisition of the image pieces and for executing the generation of the image data record, representing the image pieces, of a method according to the invention, in particular if the computer program product is executed on the control and processing unit of a geodetic surveying device according to the invention.

BRIEF DESCRIPTION OF THE DRAWINGS

The method according to the invention and the device according to the invention are described in more detail below in a purely exemplary manner on the basis of specific exemplary embodiments depicted schematically in the drawings, with further advantages of the invention also being discussed. In detail.

DETAILED DESCRIPTION

Figure 1A:
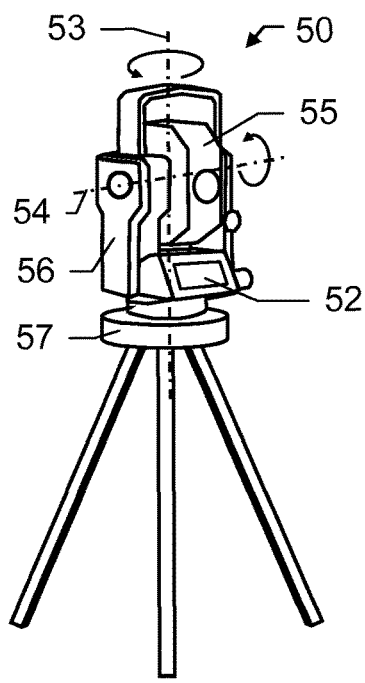
FIGS. 1a-b show a geodetic surveying device according to the prior art and a design of a targeting unit for such a device.

FIG. 1a shows a geodetic surveying device 50 according to the prior art, in this case a total station 50, comprising a targeting unit 55 which has an image acquisition unit (in particular, a camera), with an acquisition direction of the image acquisition unit being largely parallel to a measurement direction of a measuring apparatus likewise arranged in the surveying device. An optical acquisition axis for the integrated image acquisition unit therefore extends at least in parallel, in particular coaxially, with the measurement axis defined by measurement radiation that can be emitted. A field of view of the image acquisition unit is defined by the optical unit installed in the targeting unit 55 and by the design of the targeting unit 55, with the measurement radiation likewise emerging through the optical unit and the direction thereof being defined thereby.

Moreover, the surveying device 50 is provided with an output unit 52, in particular comprising a display, on which the images acquired by the camera can be depicted. Moreover, the device for aligning the measurement radiation or the acquisition direction with an object comprises two pivot axes 53, 54 (vertical axis 53 and tilt axis 54) perpendicular to one another. The surveying device 50 or the measurement radiation that can be emitted can thereby be aligned with a point to be measured by rotating the targeting unit 55 about one or both axes 53, 54. In particular, this can be brought about in a motor-driven manner. To this end, the targeting unit 55 is mounted in a support 56 in a manner rotatable about the tilt axis 54 and thus the support 56 is arranged on a base 57 in a manner rotatable about the vertical axis 53.

Figure 1B:
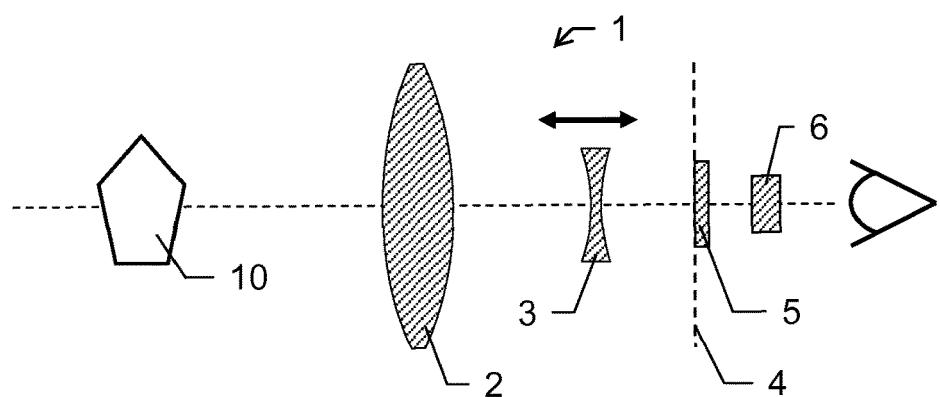

FIG. 1b shows, in an exemplary manner, a known design for the targeting unit 55, in particular wherein the targeting unit 55 is embodied as a telescopic sight.

FIG. 1b shows a known design of a telescopic sight device 1 substantially consisting of a main objective lens 2 and a movable focusing member 3, which, depending on an object distance, leads to an in-focus image of the object 10 in the image plane 4 positioned at the envisaged point. Such devices 1 are provided, in particular, in geodetic surveying devices 50 in accordance with FIG. 1a. Situated in the image plane is a graticule 5 with a reticle, which, in a manner superimposing the object image, is imaged by an eyepiece 6 and is thereby able to be perceived by a human eye.

To this end, modern total stations 50 have an autofocus functionality, with, after triggering of a measurement process by the user, the suitable position for the focusing member 3 being determined automatically and said focusing member being displaced to said position by motors.

By way of example, this can be brought about by measuring the distance to the object 10 using the installed rangefinder and by means of a table, which is known from a calibration, stored on the instrument and from which the corresponding position of the focusing member 3 can be derived for each object distance. Alternatively or additionally, the focusing can be brought about by means of a contrast measurement. In this case, the focusing member 3 is displaced over the whole positioning range and an image sequence of the object 10 is recorded simultaneously by means of an integrated camera. Image processing is used to establish that image from this image sequence in which the object is imaged with the highest contrast, and the focusing member 3 is moved to the corresponding position.

Figure 2A:
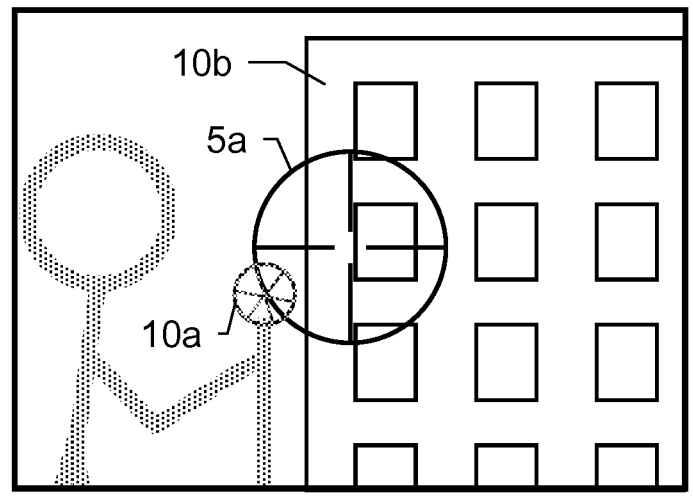
FIGS. 2a-b show a targeting procedure for a desired target for highlighting a targeting problem caused by inadequate target focusing.
Figure 2B:
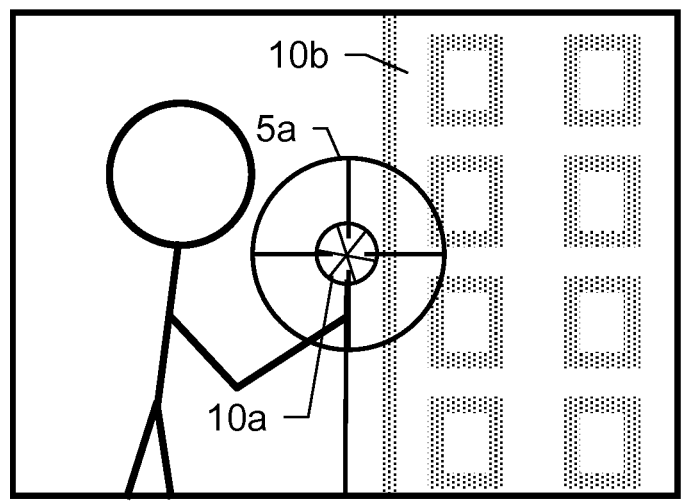

FIGS. 2a-b show a targeting procedure for a target 10a for highlighting the targeting problem caused by inadequate target focusing, as may occur in methods and using devices from the prior art.

Problems occur during targeting if the targeting unit or the telescopic sight is aligned on an object 10b at a first distance, e.g. 200 m, and the focus was set to this distance, e.g. by means of an autofocus, but the object 10a to be targeted in actual fact is situated at a second, significantly different distance, e.g. 10 m (cf. FIG. 2a). In this case, the object 10a to be targeted in actual fact is imaged greatly out of focus due to defocusing. This defocusing can be so extreme that the object 10a may no longer be perceived by the user or is no longer depicted in an acquired image. Therefore, it is difficult for the user to align the targeting unit on the object 10a to be targeted without carrying out time-consuming manual focusing on the object.

This case occurs, in particular, if a small object 10a, e.g. a reflector, which is situated in the vicinity, is intended to be targeted. In this case, there is a high probability of this object 10a not being hit at once and the autofocus being set to an object 10b in the background.

FIG. 2b shows refocused targeting of the object 10a by means of a reticle 5a, which is provided in a superposed manner by a graticule in the targeting unit. In this case, the focus is set to the user and the reflector 10a, and so these are depicted in focus, with the object 10b being depicted in a defocused and unsharp manner.

Figure 3:
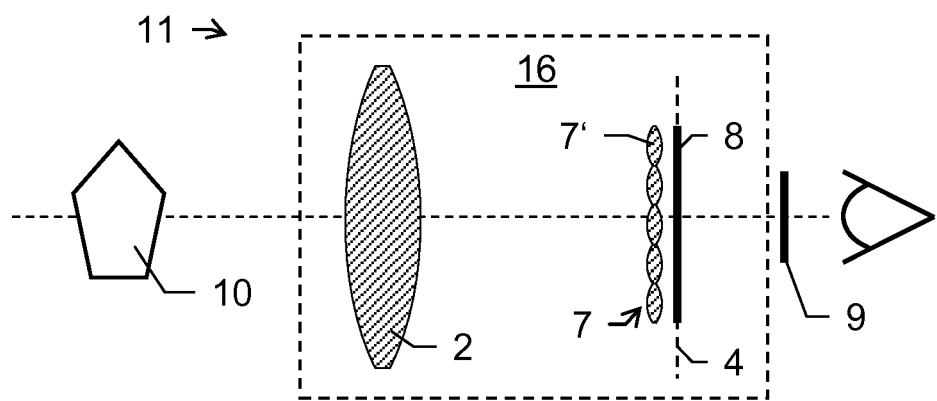
FIG. 3 shows a first embodiment of a targeting unit, according to the invention, of a geodetic surveying device.

FIG. 3 shows a first embodiment of a targeting unit 11, according to the invention, of a geodetic surveying device, comprising an image acquisition unit 16 without a focusing member known from the prior art. In this case, the object 10 is imaged by means of the main objective lens 2 and a microlens array 7 in an image sensor 8 (in the image plane 4). The microlens array 7 consists of a two-dimensional arrangement of lenses 7' with the same focal length, in particular with different focal lengths, which each image an image piece of the object 10 on the image sensor 8. In the case of lenses 7' with different focal lengths, the microlens array 7 can image, in particular, identical image pieces, i.e. image pieces representing the same section of a field of view, a number of times with (in accordance with the lens configuration) different focal lengths. By means of the image sensor 8, an image data record is generated on the basis of the images on the sensor 8, said image data record representing the image data from these images. A corresponding data record is generated analogously for an array 7 with one focal length and also with a plurality of different focal lengths. In respect of a more detailed description and clarification of this imaging of the multiplicity of image pieces and in respect of this generation of the data record, reference is made to FIGS. 10*a-b*.

The image data record therefore comprises image information with (in accordance with the focal lengths of the lenses) a distance/focusing relation (or different distance/focusing relations if use is made of lenses with different focal lengths) in respect of a field of view in which the images were acquired. Therefore, the microlens array 7 is used to acquire the so-called light field.

Specifically, this provides image information which renders it possible to derive in each case a focused depiction of at least one portion of the field of view (i.e. of objects 10 at precisely one distance) as a result of the obtainable large depth of field to different distances in the field of view. Moreover, it is possible on the basis thereof to determine, for each image point, a direction for the light incident on the image sensor.

From the totality of the image data generated thus, it is possible, for example, to calculate an image which is focused at a predetermined object distance, with it being possible, for example, for the object distance to be established by means of the installed rangefinder. The image resulting from the calculation can then be depicted e.g. by means of an EOV 9 (electro optical viewer) and observed there by the human eye.

It is possible, in particular, to calculate a range image from the image data acquired by means of the image sensor 8, i.e. the corresponding distance can be calculated and stored for each image point in place of, or in addition to, a color or intensity value.

In principle, such a calculation of the range image is brought about by triangulation. Here, the microlens array 7 with the image sensor 8 situated therebehind is considered to be an array of individual cameras, which each record an image of a virtual scene and, in the totality thereof, form a stereo camera system. The respective stereo bases required for the distance calculation are defined by the spacing between the lenses of the microlens array 7.

In the case of given depth information, the focus point corresponding to the distance can be placed individually for each image point to be imaged and an image can be calculated from the totality of the recorded image information, in which image each image point (within the scope of the object distances provided by the optionally different focal lengths of the lenses 7') is depicted in focus. This allows a depiction of a scene with a large depth of field, i.e. objects at both short and longer distances from the targeting unit 11 are, simultaneously, depicted in focus in the image that can be generated. According to the invention, this is made possible, in general, by the significantly increased depth of field brought about by arranging the lens array 7.

Moreover, a calculation of a distance to an object or of a distance profile (e.g. for the whole image) can specifically be calculated on the basis of sharpness differences in the image. Alternatively, such a calculation can also already be brought about on the basis of the image data record. To this end, at least rough knowledge about the focus range obtainable by the microlens array 7 (together with the optical system of the image acquisition unit 16) is assumed and corresponding information is preferably stored in the system.

Figure 4:
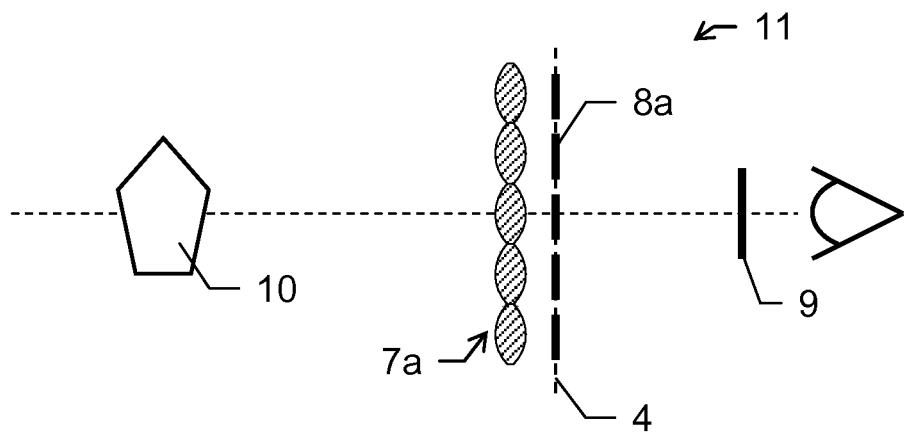
FIG. 4 shows a second embodiment of a targeting unit, according to the invention, of a geodetic surveying device.

In particular, an object distance can moreover be established using the rangefinder installed in the geodetic surveying device and an image can then be calculated from the generated image data record in such a way that objects at the correspondingly established distance are depicted in focus in the image. FIG. 4 shows a second embodiment of a targeting unit 11 according to the invention or of an image acquisition unit in the targeting unit 11. In this case, the image acquisition unit once again comprises a microlens array 7*a*, with moreover a multiplicity of sub-image sensors 8*a* (e.g. as part of an image sensor comprising these sub-image sensors 8*a*) being arranged in such a way that the images of the object 10 or of a plurality of objects from the common field of view, generated by the microlens array 7*a*, can be acquired by these sensors 8*a* and an overall data record can be generated thereby. The data record then comprises image information in accordance with the totality of the image pieces generated by the lenses of the array 7*a*. Moreover, provision is made for an electro optical viewer 9 for displaying images that can be generated from the data record.

As a result of the special configuration of the microlens array 7*a* and the arrangement of the plurality of image sensors 8*a* in such a way that e.g. a specific number and arrangement of sensors 8*a* is assigned to each lens of the array 7*a*, it is possible, in accordance with this embodiment, to dispense with a main objective lens—as shown in FIG. 3—with the increased depth of field nevertheless being obtained.

Figure 5:
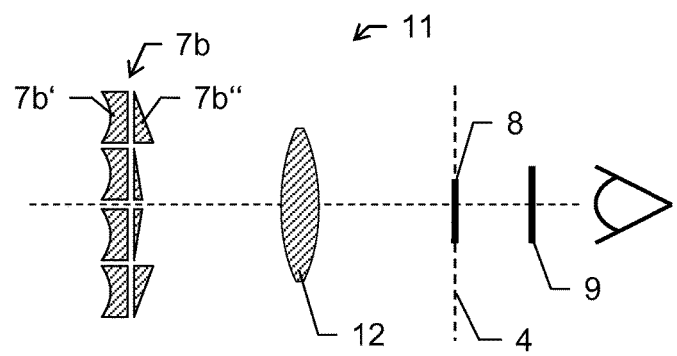
FIG. 5 shows a third embodiment of a targeting unit, according to the invention, of a geodetic surveying device.

FIG. 5 shows a third embodiment for a targeting unit 11 according to the invention, comprising a microlens array 7*b* with a two-part design, a lens 12, an image sensor 8 and an electro optical viewer 9. Here, the microlens array 7*b* is constructed in such a way that incident light is in each case refracted by the array 7*b* at a first component 7*b*' (e.g. a concave-plane lens) and optically demagnified, and the chief ray is directed in the direction of the lens 12 by a second component 7*b*" (e.g. a prism).

By means of the array 7*b*, the bundle of light is directed to the lens 12 and then, in turn, imaged on the image sensor 8. On the basis of this, it is possible to generate a raw image data record which contains image information, in particular also directional information, from all image pieces generated by the lens array 7*b*.

This arrangement of the imaging elements, which is inverted to that in FIG. 3, is advantageous in that the image sensor can, with the aid of the lens 12, be adapted to the lateral extent of the array, for example be enlarged.

Figure 6:
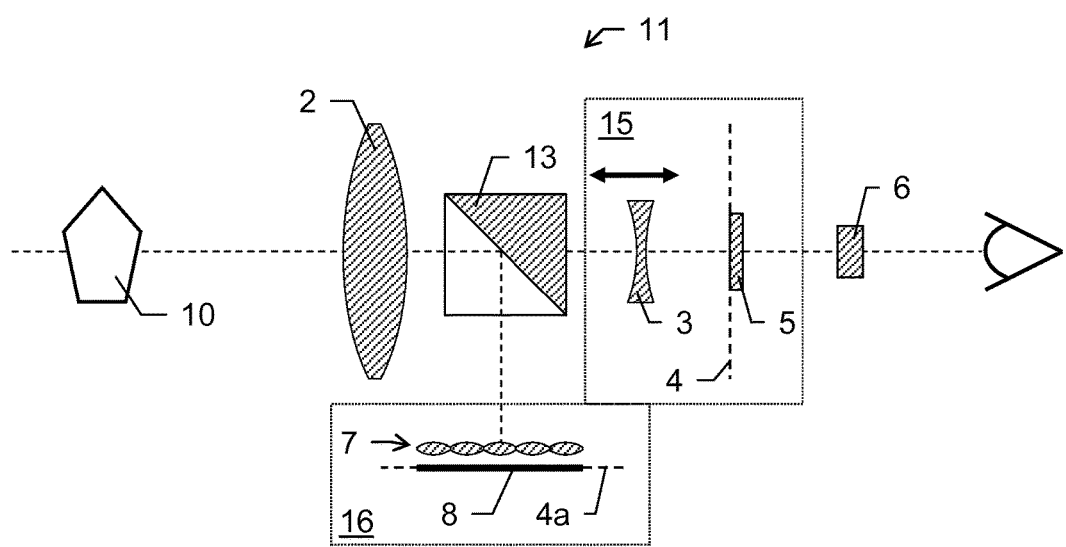
FIG. 6 shows a special embodiment according to the invention of a targeting unit of a surveying device, comprising a combination of two image acquisition units.

FIG. 6 shows a special embodiment according to the invention of a targeting unit 11 of a surveying device comprising a first image acquisition unit 15 and a second image acquisition unit 16 according to the invention. The targeting unit 11 comprises a beam splitter 13 for providing incident light radiation to both the first and the second image acquisition unit 16.

The first image acquisition unit 15 is embodied in accordance with an embodiment of an image acquisition unit 15 corresponding to the prior art (cf. FIG. 1b), wherein the generated image can be observed by a user by means of an eyepiece 6. Here, provision is made for a focusing member 3, the positioning of which can be changed, for variable focusing purposes. The graticule 5 is arranged in a first image plane 4.

The second image acquisition unit 16 comprises a microlens array 7 and an image sensor 8, with the image sensor being arranged in a second image plane 4a defined by the main objective lens 2 and the beam splitter 13. By means of the beam deflection by the beam splitter 13, an image data record can be generated using the second image acquisition unit 16, the image information comprised in which image data record containing the data of a number of image pieces corresponding to the lenses of the array 7. Therefore, in general, it is possible to generate information corresponding to the embodiments described in conjunction with FIGS. 3-5.

Figure 7:
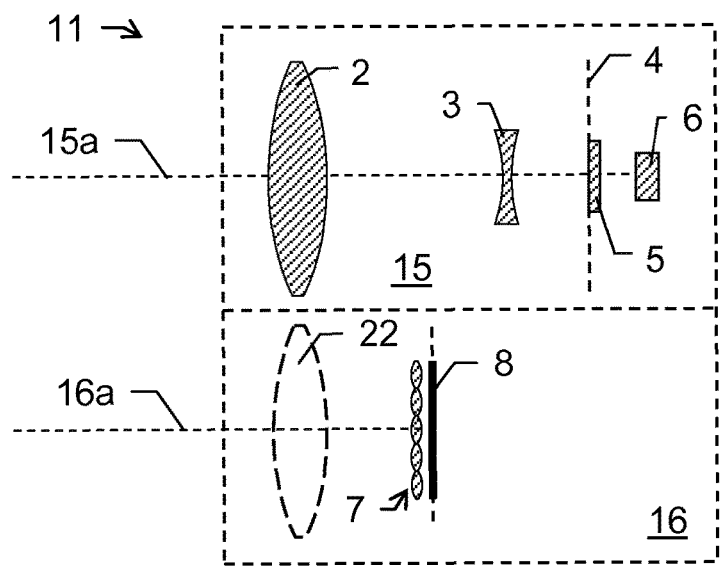
FIG. 7 shows a further special embodiment according to the invention of a targeting unit with two image acquisition units arranged separately from one another.

FIG. 7 shows a further embodiment according to the invention of a targeting unit for a geodetic, with a first optical acquisition axis 15a being defined by the first image acquisition unit 15 and a second optical acquisition axis 16a being defined by a second image acquisition unit 16. In particular, these axes 15a, 16a are arranged parallel to one another but can, in accordance with an alternative embodiment (not shown here), be aligned at an angle to one another.

In this case, the first image acquisition unit 15 corresponds to an embodiment in accordance with FIG. 1b. The second image acquisition unit 16 corresponds to the principle in accordance with FIG. 3, wherein an electro optical viewer is not provided and the images acquired by means of the image sensor or the generated data are transmitted to a display unit or a processing unit. By way of example, such processing units can be arranged on the geodetic surveying device or be provided on a remote control unit. In accordance with this embodiment, the second image acquisition unit 16 can be provided e.g. as an overview camera on a total station.

Furthermore, in alternative embodiments, the second image acquisition unit 16 can be embodied according to an embodiment in accordance with FIG. 4 or 5. In particular, it is possible in this case to dispense with the objective lens 22 of the second image acquisition unit 16 arranged in front of the microlens array 7.

An overview image which can be generated thus can be depicted on a touch display and a stylus can be used to tap an object shown thereon. It is then possible, from the generated image data, to derive the depth or distance for the selected object and, on the basis thereof, the focusing member 3 of the measurement camera (first image acquisition unit 15) can be driven to the corresponding focus position (autofocus). As a result, the measurement camera is focused on the object. Additionally, the center of the measurement camera (reticle) can be aligned in a motor-driven manner on the object.

Figure 8:
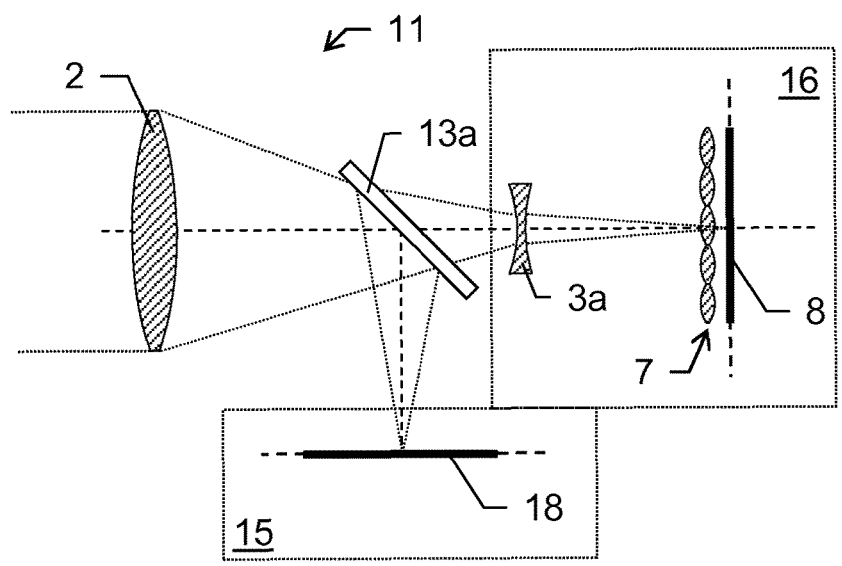
FIG. 8 shows a further special embodiment according to the invention of a targeting unit with a first and a second image acquisition unit.

FIG. 8 shows a further special embodiment, according to the invention, of a targeting unit 11 with a first and a second image acquisition unit 15, 16. The beam path is split by means of a beam splitter 13a downstream of the common objective lens 2. The intensity of the light field is acquired in the first channel by means of a first image sensor 18. In the second channel, the illumination of the lens array 7 is adapted in a suitable manner by an optical magnification or demagnification (by the element 3a) of the optical illumination of the first image sensor 18 and a plenoptic acquisition of the light field is realized by a second image sensor 8. By way of example, a special embodiment of the linear scale and focal length division is the following: the distance between the array 7 and the sensor 8 in this case corresponds to the focal lengths of the lenses of the array 7, i.e. the focal points of the individual lenses lie on the detection surface of the sensor 8.

Here, the lens array 7 and the first sensor 18 are assigned to the same object distance (in the object space).

By the selection of the post-magnification optical unit 3a, the size ratio between array 7 and sensor 18 can be set in a defined manner, for example in order to increase the resolution at a predetermined distance range. In this case, the post-magnification optical unit 3a, array 7 and sensor 18 can be embodied in such a way that, in the case of a low resolution, precisely one pixel and, in the case of an increased resolution, precisely n*n pixels of the sensor 18 are assigned to each array lens.

Figure 9:
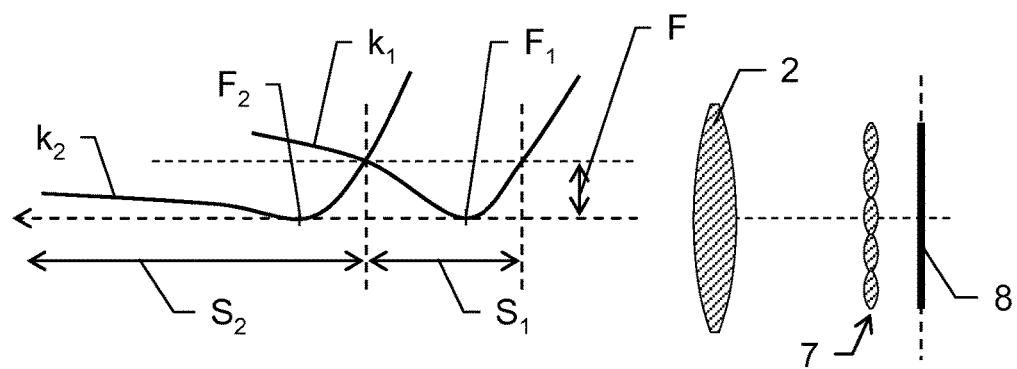
FIG. 9 shows an embodiment according to the invention of a targeting unit with a microlens array with optical elements (single lenses) with two different focal lengths ($f_1$, $f_2$), together with an illustration of a depth of field obtainable thereby.

FIG. 9 shows an exemplary embodiment, according to the invention, of a targeting unit with a microlens array 7 comprising optical elements (individual lenses) with two focal lengths ($f_1$, $f_2$) and a CMOS 8, together with an illustration in respect of depth of field ranges $S_1$, $S_2$ which can be acquired thereby. The first depth of field range $S_1$ corresponds to a distance range within which this object is considered to be depicted sharply (in focus) (=focus range F), i.e. if the object is present in this first distance range, it is imaged and acquired in focus on the sensor 8 by an image made by the individual lenses with the focal length $f_1$. An analog statement applies to the imaging with respect to the second depth of field range $S_2$ with the individual lenses with the focal length $f_2$ and a second distance range connected therewith. By way of example, objects at a distance of between 2 m and 10 m are imaged in focus by the lenses with the focal length $f_1$ (with the ideal focusing for $f_1$ for example lying at a distance $F_1$ of 4 m) and objects which are situated further away than 10 m are imaged in focus by the lens group with the focal length $f_2$ (with the ideal focusing for $f_2$ for example lying at a distance $F_2$ of 13 m). Here, the two curves $k_1$ and $k_2$ schematically represent the change of a point image radius of an imaged object point as a function of the distance between the array 7 and the object point to be acquired.

As a result of such an array 7 with such lenses having different focal lengths $f_1$, $f_2$, the whole depth of field range (object space) can be configured in a correspondingly extended manner and therefore it is possible to achieve a correspondingly large depth of field. A more detailed illustration of the imaging properties, reference is made to FIG. 11.

Figures 10A, 10B:
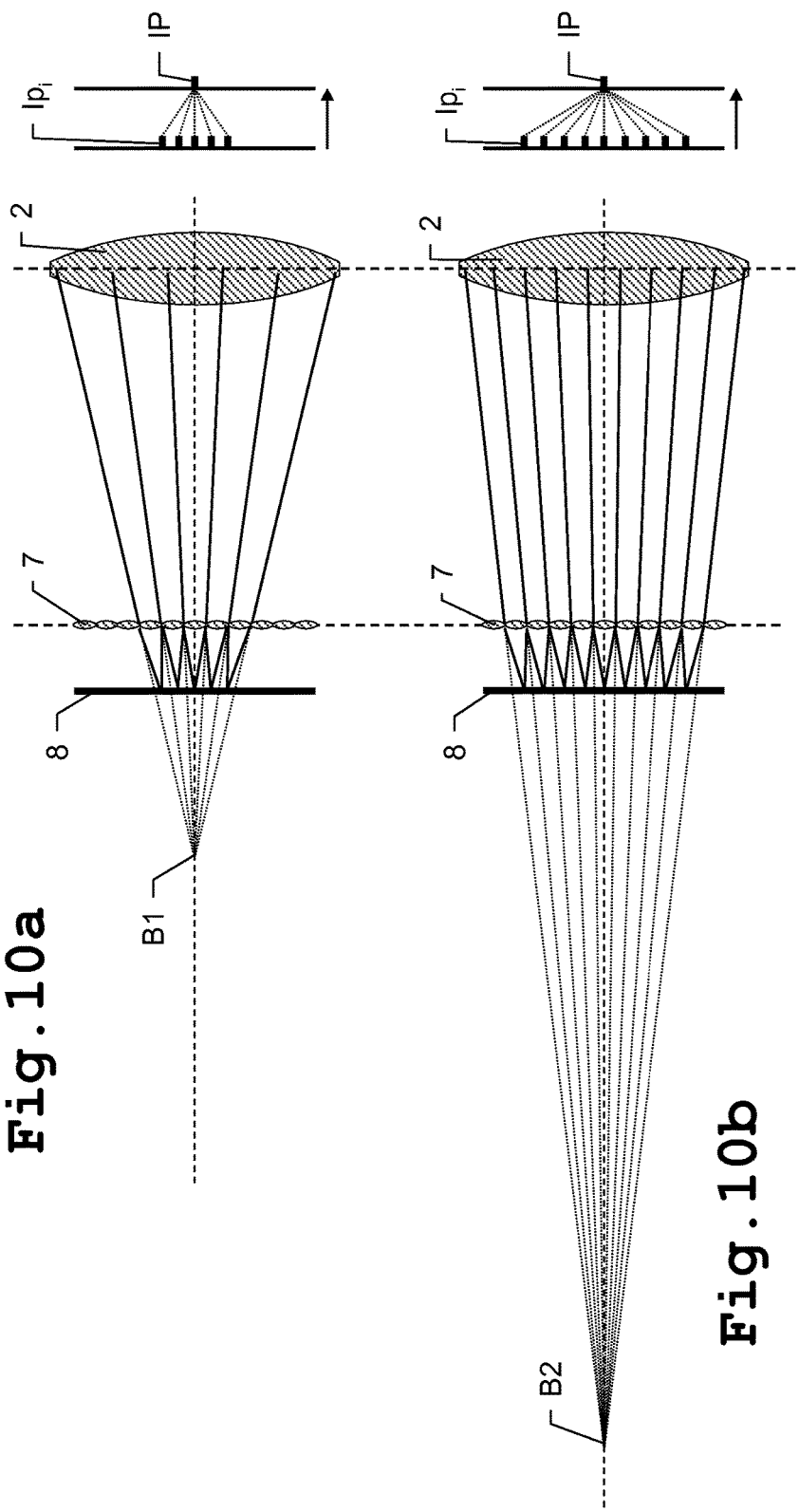
FIGS. 10a-b show the use according to the invention of the plenoptic principle for a geodetic surveying device.

FIGS. 10a-b show the use according to the invention of the plenoptic principle for a geodetic surveying device with a lens array 7 with optical elements having one focal length.

Two object points (not depicted here) lie at different distances along the optical axis. By means of the main objective lens 2, the light beams of the point situated further away are focused on B1 and those of the closer point are focused on B2. In order to obtain an in-focus image, the image sensor 8 would now have to be displaced to the corresponding position B1 or B2. Then, the light beams from the respective object point are focused on precisely one pixel on the sensor 8, e.g. in this case on the pixel which corresponds to the image principal point since the two object points lie on the optical axis. In contrast thereto, the light beams from one object point are now, according to the plenoptic principle, imaged by means of the microlens array 7 on the various pixels of the sensor 8—in this case, these are different for the closer point and the point situated further away. By observing or processing (accumulating) these pixels together, it is possible, for example, to calculate the intensity value for the object point on the image sensor 8. Here, depending on the distance of the imaged object, different pixels and a different number of pixels are used for the calculation.

On the right-hand side of FIGS. 10*a*-*b*, this "accumulating" is depicted, purely schematically in each case, on the basis of a virtual cross section. The information, distributed over the individual pixels, in respect of the one imaged object point is in this case combined to provide total information for the object point (depicted by the respective arrows). Thus, the information from individual pixels or pixel groups $Ip_i$ is unified to provide pixel information IP.

Figure 11:
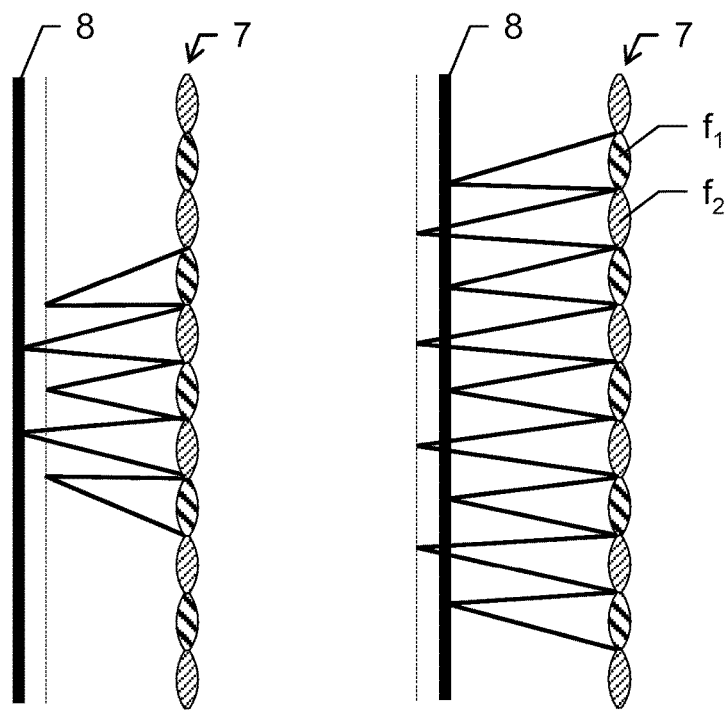
FIG. 11 shows the use according to the invention of a lens array with two different focal lengths.

FIG. 11 shows the principle in the case of a use according to the invention of a lens array 7 with two different focal lengths—a shorter focal length $f_1$ for objects at distances from e.g. 2 m to 20 m and a longer focal length $f_2$ for objects at distances from e.g. 20 m to infinity. The left-hand illustration shows the imaging of an object point situated further away and the right-hand side shows the imaging of a closer object point (in principle corresponding to FIGS. 10*a*-*b*). For the object point situated further away, only those pixels which are imaged in focus on the image sensor with the longer focal length $f_2$ are considered in the calculation, and for the object point situated closer, it is only those pixels which are imaged in focus on the image sensor with the shorter focal length $f_1$.

In principle, it is possible to reconstruct spatially resolved points of objects on the basis of the measured light-field data, even if no image pieces were acquired in focus. Here, in the simplest case, there is a point-by-point back-calculation to a plane lying in the object space from the light field acquired with the lens array and a two-dimensional sensor.

Figure 12:
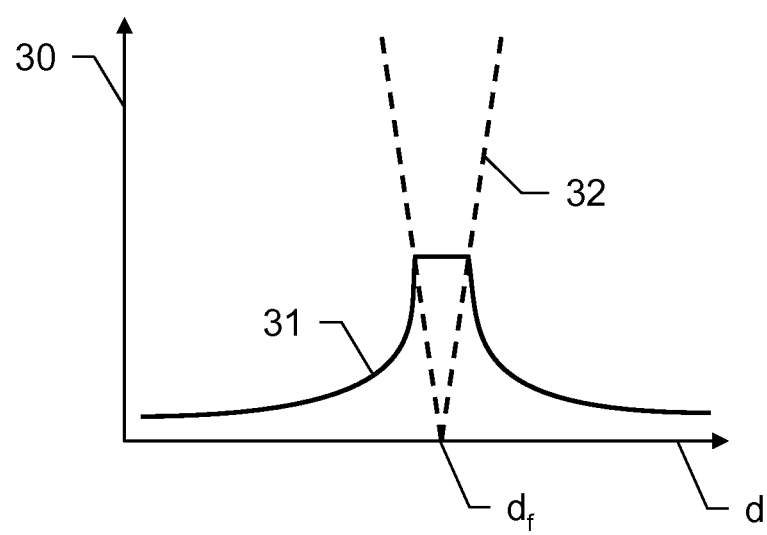
FIG. 12 shows an illustration of the expected image unsharpness reconstructed by means of the calculation from the plenoptically acquired data record, as a function of the object distance.

FIG. 12 shows an illustration of the expected image unsharpness 30 reconstructed by means of the calculation from a plenoptically acquired data record, as a function of the object distance d. The achievable sharpness is at a minimum (great unsharpness 30, cf. full line 31) if the object is imaged directly (and, in particular, in focus) on the lens array, i.e. if the object is present in or around the focal distance $d_f$. In this constellation, the spatial resolution is limited by the size of the miniaturized lenses of the lens array.

For comparison purposes, FIG. 12 also shows the expected unsharpness of a standard camera with the conventional imaging optical unit (dashed line 32). The inverse behavior of the blur radius between the standard camera and the plenoptic camera is noticeable: the conventional camera generates the greatest possible image sharpness (i.e. lowest unsharpness) precisely when the object is imaged directly on the two-dimensional sensor (is present at the object distance $d_f$), while the achievable image sharpness of the plenoptic camera is limited in this case by the coarse structure of the microlenses. This inverse behavior can be employed in an advantageous manner using an embodiment in accordance with FIG. 8, with the first sensor 18 and the lens array 7 being assigned to the same object distance (in the object space). In this special configuration, the two-dimensional sensor 18 generates sharp images when the plenoptic camera has the lowest spatial resolution (around the object distance $d_f$); by contrast, the plenoptic camera has a better effect at all other distances. This mutually complementary behavior can, for example, be used in view of the reliable targeting of the object.

According to the invention, a light-field camera can be provided in a geodetic surveying device in addition or as an alternative to a further image acquisition unit (e.g. a visual camera or telescopic sight with a unit to observe through).

In accordance with a further embodiment according to the invention—not shown here—an image acquisition unit comprising a microlens array and an image sensor for acquiring the images generated by the array is arranged separately from the targeting unit, for example on the support of a total station.

An advantage of a design according to the invention of a targeting unit or of a geodetic surveying device according to an embodiment in accordance with one of FIGS. 3-8 lies in the fact that there is no need to mechanically move the focusing member for focusing to a predetermined object distance, but rather a corresponding calculation in respect of the desired focus plane can be carried out on the basis of the image data record. Mechanical movement for focusing always requires a certain amount of time and leads to possible aberrations, which can have a negative effect on the targeting accuracy, in the optical image due to mechanical limitations. In accordance with the invention, the image focused to a predetermined object distance can be calculated from the acquired image data record, which can be carried out significantly faster than a time-consuming readjustment of a focusing component.

Moreover, the design of the image acquisition unit in accordance with one of the Figures shown (FIGS. 3-8) relating to the invention enables the generation of an image with a very large depth of field since the focus point for each depicted image point can be individually set and displayed in accordance with the object distance. The depth information required for this can—as explained above—for example be derived from the recorded image data by means of known triangulation methods.

When calculating an image, it is possible to take into account, i.e. correct, errors which for example are caused by aberrations of the main objective lens 2. Such a correction of the lens error, e.g. distortion, can in this case advantageously be brought about in conjunction with the image calculation.

The depth information which can be derived from the image data record can be transformed into a point cloud taking into account the alignment of the targeting unit 11 at the time of the recording, i.e., on the basis of the image acquisition, it is possible to determine three-dimensional coordinates for each image point. The scanning region can be extended beyond the current image field by successive, in particular automatic, pivoting of the telescopic sight in the vertical and/or horizontal direction. This allows the user to record, in three dimensions, an angle range which extends beyond the image field of the telescopic sight.

It is understood that the depicted figures only depict possible exemplary embodiments schematically. According to the invention, the various approaches can be combined both with one another and with methods and devices for targeting target points, and also with surveying devices from the prior art.

What is claimed is:
1. A theodolite device comprising:
    a beam source for generating measurement radiation defining a measurement axis,
    a base defining a vertical axis,
    a telescopic sight for targeting an object by aligning the telescopic sight on the object,
    a support carrying the telescopic sight and defining a tilt axis, the support being arranged on the base and rotatable relative to the base about the vertical axis, and the telescopic sight being arranged rotatable relative to the support about the tilt axis,
an angle- and distance-measuring functionality, and
a control and processing unit,
wherein the telescopic sight comprises an image acquisition unit for acquiring images of an object in a field of view:
defined by the image acquisition unit, and
directed parallel to the measurement axis, and
wherein the image acquisition unit at least comprises:
an image sensor; and
a microlens array with a plurality of diffractive and/or refractive optical elements arranged in a defined two-dimensional manner,
wherein, during a measurement process by means of the image sensor, the image acquisition unit is configured to:
acquire image pieces respectively generated by the diffractive and/or refractive optical elements and representing at least parts of the object, and
generate an image data record representing the image pieces and comprising image information with a distance/focusing relation in respect of the field of view,
wherein an image corresponding to a currently measured distance is generated based on the currently measured distance by the control and processing unit from the image data record in such a way that objects situated at the measured distance are depicted in the image with a first degree of sharpness and objects at a different distance are depicted with a lower degree of sharpness, wherein the currently measured distance is measured with the measurement radiation of the beam source.

2. The theodolite device according to claim 1, wherein the microlens array is arranged with a fixed position and alignment relative to the image sensor and a respective beam entry direction for light beams incident on the image sensor can be derived from the image data record.

3. The theodolite device according to claim 1, wherein the diffractive and/or refractive optical elements have at least two different focal lengths.

4. The theodolite device according to claim 3, wherein the image sensor and the microlens array are arranged and interact in such a way that, as a result of the arrangement and the focal lengths of the diffractive and/or refractive optical elements, the generated image pieces in each case represent at least part of the field of view and can be projected onto the image sensor with a defined offset.

5. The theodolite device according to claim 3, wherein the microlens array is embodied and arranged in such a way that image pieces of objects at different object distances can be projected onto a common image plane by the groups of optical elements, the image sensor being arranged for acquiring the image pieces generated in the image plane.

6. The theodolite device according to claim 5, wherein the image sensor is arranged in the image plane.

7. The theodolite device according to claim 1, wherein the diffractive and/or refractive optical elements of the microlens array are assigned to a number of groups, with the optical elements assigned to a group in each case having the same focal length and a first group differing from a second group in terms of the focal length of the assigned optical elements.

8. The theodolite device according to claim 1, wherein the image acquisition unit comprises an objective lens arranged in such a way that
incident light from the field of view is projected onto the microlens array by the objective lens or
light incident through the microlens array is projected onto the image sensor by the objective lens.

9. The theodolite device according to claim 1, wherein the image sensor comprises a plurality of sub-sensors arranged in two dimensions, with the image pieces generated by the microlens array being projectable onto the sub-sensors and it being possible to generate the image data record by means of the plurality of sub-sensors.

10. The theodolite device according to claim 1, wherein the image acquisition unit is embodied as an overview camera, the overview camera defining a field of view separate from the telescopic sight and being arranged separately from the telescopic sight.

11. The theodolite device according to claim 1, wherein the image acquisition unit is arranged in the telescopic sight in such a way that the field of view of the image acquisition unit substantially corresponds to the field of view of a telescopic sight for targeting the target of the telescopic sight.

12. The theodolite device according to claim 1, wherein the control and processing unit is configured to:
generate a plurality of image pieces, respectively imaging the object at least in part with at least two different depth of field ranges,
acquire the image pieces and
generate an image data record representing the image pieces.

13. A method for image acquisition using a theodolite device comprising:
a beam source for generating measurement radiation for distance measuring, wherein the measurement radiation defines a measurement axis,
a base defining a vertical axis,
a telescopic sight for targeting an object by aligning the telescopic sight on the object,
a support carrying the telescopic sight and defining a tilt axis, the support being arranged on the base and rotatable relative to the base about the vertical axis, and the telescopic sight being arranged rotatable relative to the support about the tilt axis,
an angle- and distance-measuring functionality, and
a control and processing unit,
wherein the telescopic sight comprises an image acquisition unit for acquiring images of an object in a field of view
defined by the image acquisition unit and
directed parallel to the measurement axis;
the method comprising:
generating a plurality of image pieces, respectively imaging the object at least in part with at least two different depth of field ranges,
acquiring the image pieces and
generating an image data record representing the image pieces and comprising image information with a distance/focusing relation in respect of the field of view,
wherein an image corresponding to a currently measured distance is generated based on the currently measured distance from the image data record in such a way that objects situated at the measured distance are depicted in the image with a first degree of sharpness and objects at a different distance are depicted with a lower degree of sharpness, wherein the currently measured distance is measured with the measurement radiation of the beam source.

14. The method according to claim 13, wherein distance information for the object is derived from the image data record.

15. The method according to claim 13, wherein distance information for the object is derived from the image data record using triangulation for each image piece with a 3D point cloud being generated.

16. The method according to claim 13, wherein a sub-image data record is derived from the image data record, the former representing a sub-image with at least one image region which can be depicted in focus, with image elements within the at least one image region being generated substantially on the basis of a single image piece or a defined number of image pieces from the plurality of image pieces generated together, on the basis of the different depth of field ranges for the image pieces with the image elements being acquired with a common object distance.

17. The method according to claim 13, wherein a sub-image data record is derived from the image data record, the former representing a sub-image with at least one image region which can be depicted in focus, with image elements within the at least one image region being generated substantially on the basis of a single image piece or a defined number of image pieces from the plurality of image pieces generated together, on the basis of the different depth of field ranges for the image pieces, the image region being selected by a user input.

18. The method according to claim 13, wherein an in-focus image with a depth of field which is as large as possible corresponding to the different depth of field ranges for the image pieces, is calculated from the image data record.

19. A tangible, non-transitory computer program product, stored on a machine-readable medium that when executed by a processor causes the processor to perform the method of claim 13, the method comprising:
controlling the generation of a plurality of image pieces;
controlling the acquisition of image pieces; and
controlling the generation of the image data record, representing the image pieces.

* * * * *